United States Statutory Invention Registration [19]

[11] Reg. Number: H539

Sievert [43] Published: Nov. 1, 1988

[54] ARCUATE ROLLING BEARING

[75] Inventor: Steven A. Sievert, Ridgecrest, Calif.

[73] Assignee: The United States of America as represented by the Secretary of the Navy, Washington, D.C.

[21] Appl. No.: 32,670

[22] Filed: Apr. 1, 1987

[51] Int. Cl.[4] ..... F16C 33/46
[52] U.S. Cl. ..... 384/614
[58] Field of Search ..... 384/502, 490, 528, 614, 384/499, 502, 523, 548

[56] References Cited

U.S. PATENT DOCUMENTS

| | | | |
|---|---|---|---|
| 1,168,727 | 1/1916 | Jenigar | 248/182 |
| 1,169,881 | 2/1916 | Sorensen | 384/614 |
| 2,590,939 | 4/1952 | Cobb . | |
| 2,796,226 | 6/1957 | Dalton et al. | 248/183 |
| 3,383,081 | 5/1968 | Guttenberg | 248/346 |
| 3,477,297 | 11/1969 | Howe | 74/5.1 |
| 3,527,435 | 9/1970 | Lapp et al. | 248/184 |
| 3,721,478 | 3/1973 | Anderson et al. . | |
| 3,752,541 | 8/1973 | McVey . | |
| 4,152,942 | 5/1979 | Anderson et al. | 74/5 R |
| 4,199,762 | 4/1980 | Estlick et al. | 343/765 |
| 4,324,378 | 4/1982 | Groutage | 248/184 |
| 4,332,426 | 6/1982 | Speicher . | |
| 4,344,596 | 8/1982 | Hjaeresen | 248/50 |
| 4,629,260 | 12/1986 | Kasai | 384/49 |

OTHER PUBLICATIONS

Rodgers, A. —High-G Gimbal Technology Studies, Jul. 1979—Redstone Arsenal, Alabama.

*Primary Examiner*—Stephen C. Buczinski
*Assistant Examiner*—Linda J. Wallace
*Attorney, Agent, or Firm*—William C. Townsend

[57] ABSTRACT

A bearing for a ball-shaped gimbal ring of a gimbal system has opposing arcuate tracks mounted individually to a gimbal ring and a base of the system. In a first embodiment, a ring track is segmentally opposed by a base track. Balls are disposed within the ring track and are kept there by a cage and retainer. A second embodiment includes a gimbal ring track that is fully opposed by the base track. Caged balls partially fill these tracks so that the balls are constantly opposed by the tracks in spite of differences in track and ball speeds.

13 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 2
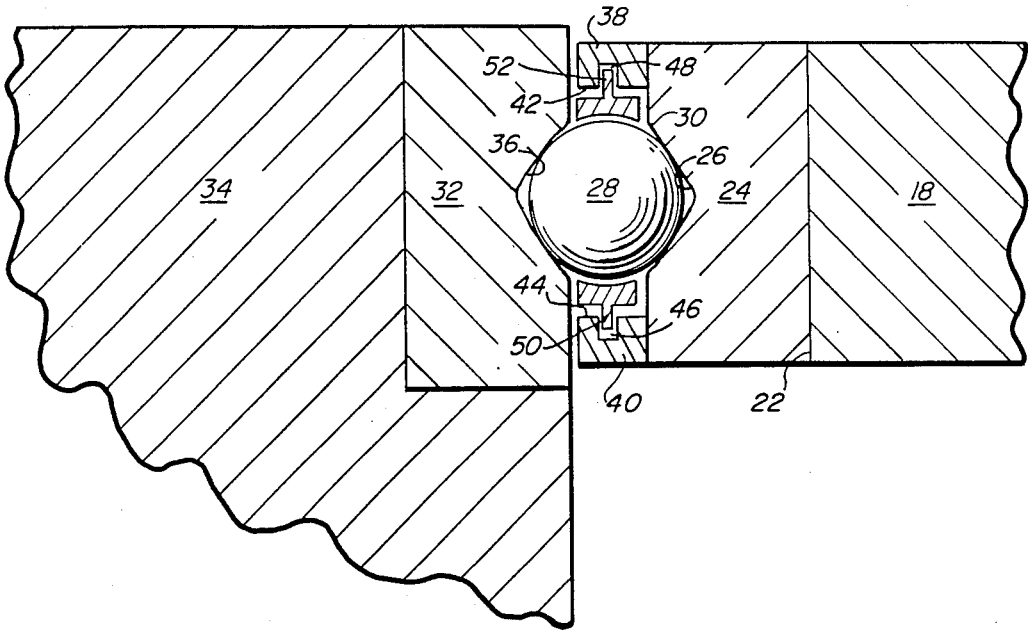
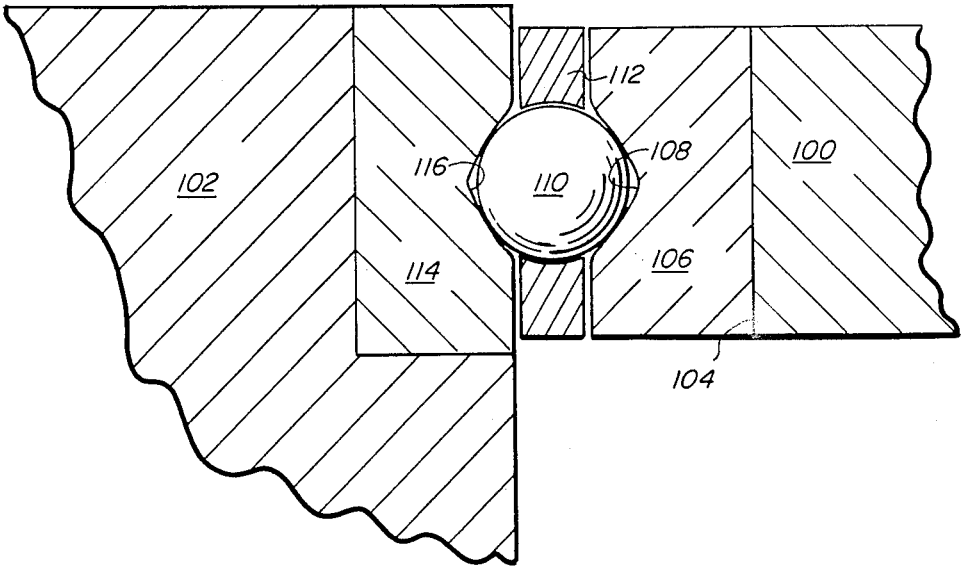
FIG. 5

ARCUATE ROLLING BEARING

BACKGROUND OF THE INVENTION

1. Field of the Invention

The invention pertains generally to gimbal systems of the type used to support antenna units. More particularly, the invention relates to a bearing used to support the gimbal rings of such systems.

2. Description of the Prior Art

In many applications, it is important that a platform maintain a precise orientation irrespective of the movements of the platform's support. Traditionally, this has been accomplished by mounting the platform within a concentric arrangement of inner and outer gimbal rings. Typical gimbal systems of this sort include a mounting base, an outer gimbal ring rotatably attached to the mounting base, and an inner gimbal ring rotatably attached to the outer ring for rotation about an axis that is perpendicular to the rotational axis of the outer ring. This structure allows a platform attached to the inner ring to stabilize, or maintain its line of sight, even though the support of the platform is unsteady. The limits of this line of sight define a "look angle", determined by the shape of the outer gimbal ring. The shape of the outer ring is, among other things, dictated by the bearing used to attach it to the mounting base. This bearing must not only allow the inner gimbal ring and platform to be able to swing through a large look angle, but, in the case in which sensitive electronics are involved, must also provide an extremely steady, low vibration coupling to the outer ring base.

There are numerous prior art bearing designs for maintaining precision gimbal ring alignment and movement. They all, however, have certain deficiencies. Current methods of aligning the outer gimbal ring involve the use of bearing races which are a part of the outer edges of the gimbal ring itself. A common scheme is to allow the outer ring to ride upon several relatively large rollers. The effect of this design is a concentration of vibrational and other loadings over a small segment of the ring. Another prior art method is to fashion a recirculating bearing path in the platform base. The path is positioned to allow circulating balls to contact bearing races on the outer edges of the gimbal ring. Dimensional limitations require the balls to negotiate tight corners, lessening the smoothness of the gimbal ring movement.

SUMMARY OF THE INVENTION

The invention provides a bearing for rotatably supporting a gimbal ring of a gimbal system. The bearing permits the gimbal ring to rotate about an axis; therefore as used herein, "axially" means in a direction along an axis about which such a gimbal ring rotates or pivots in relation to a base for the ring. Though the bearing is used in pairs, only a single bearing will be discussed and the reader may assume that what applies to one bearing applies equally to the other.

A first embodiment includes a first circularly arcuate race mounted to an axially facing edge of a generally bail-shaped gimbal ring. This first race defines a first axially facing bearing track. A plurality of balls are disposed in rolling engagement with the first track of this first race. A cage is used to hold and separate the balls without obstructing their contact with the first track. Guide members are mounted to opposite sides of this cage. Coaxially mounted to the first race are shoulders defining opposing, radially extending grooves. The guide members slideably engage these grooves to keep the cage substantially adjacent to the first race and the balls in substantially constant contact with the first track. A second circularly arcuate race is attached to a base of the gimbal system. The second race defines a second axially facing bearing track of the same radius as the first track. This second track is positioned in opposing relationship to the first track, however the second track opposes only a portion or segment of the first track. A number of balls are disposed in rolling engagement between the opposing first and second tracks, while other unopposed balls continue within the first track beyond the ends of the second track. The unopposed balls are kept in the first track by the cage member and grooved shoulder structures previously mentioned and serve to provide a continuous rolling surface between the gimbal ring and the base as the gimbal ring rotates with respect to the base.

A second embodiment also includes a first circularly arcuate race. The first race is attached to an axially facing edge of a generally bail-shaped gimbal ring. The first race defines a first axially facing bearing track. A plurality of balls are disposed in rolling engagement with this first track. These balls are held and separated by a ball cage. A second circularly arcuate race defining a second axially facing bearing track is attached to a base of the gimbal system. This second track has the same radius as the first track, and is positioned in opposing relationship to the first track so that the balls are rollably engaged and the cage is slideably engaged between the two tracks. The first and second tracks extend beyond the ball cage so that, as the gimbal ring is rotated with respect to the base, any advancing balls are retained within the races and the need for cage keeper structure is avoided.

Each of these embodiments allow rotational and other loads to be distributed over relatively large bearing interfaces, thus making smooth and precise gimbal ring movement possible.

OBJECTS OF THE INVENTION

A primary object of this invention is to provide a bearing suitable for gimbal ring mounting applications.

Another object of the invention is to provide a gimbal ring bearing that permits large look angles for a gimballed platform effectively attached thereto.

Yet another object of the invention is to provide a gimbal ring bearing that can maintain smooth and precise operation while experiencing high loads and intense vibration.

These and other objects will become apparent when the following specification, drawings and claims are construed together.

BRIEF DESCRIPTION OF THE DRAWINGS

FIG. 2 is a cross-section of bearing interfaces of the embodiment shown in FIG. 1.

FIG. 5 is a cross-section of bearing interfaces of the embodiment shown in FIG. 4.

DESCRIPTION OF THE PREFERRED EMBODIMENTS

First Embodiment

Figure 1:
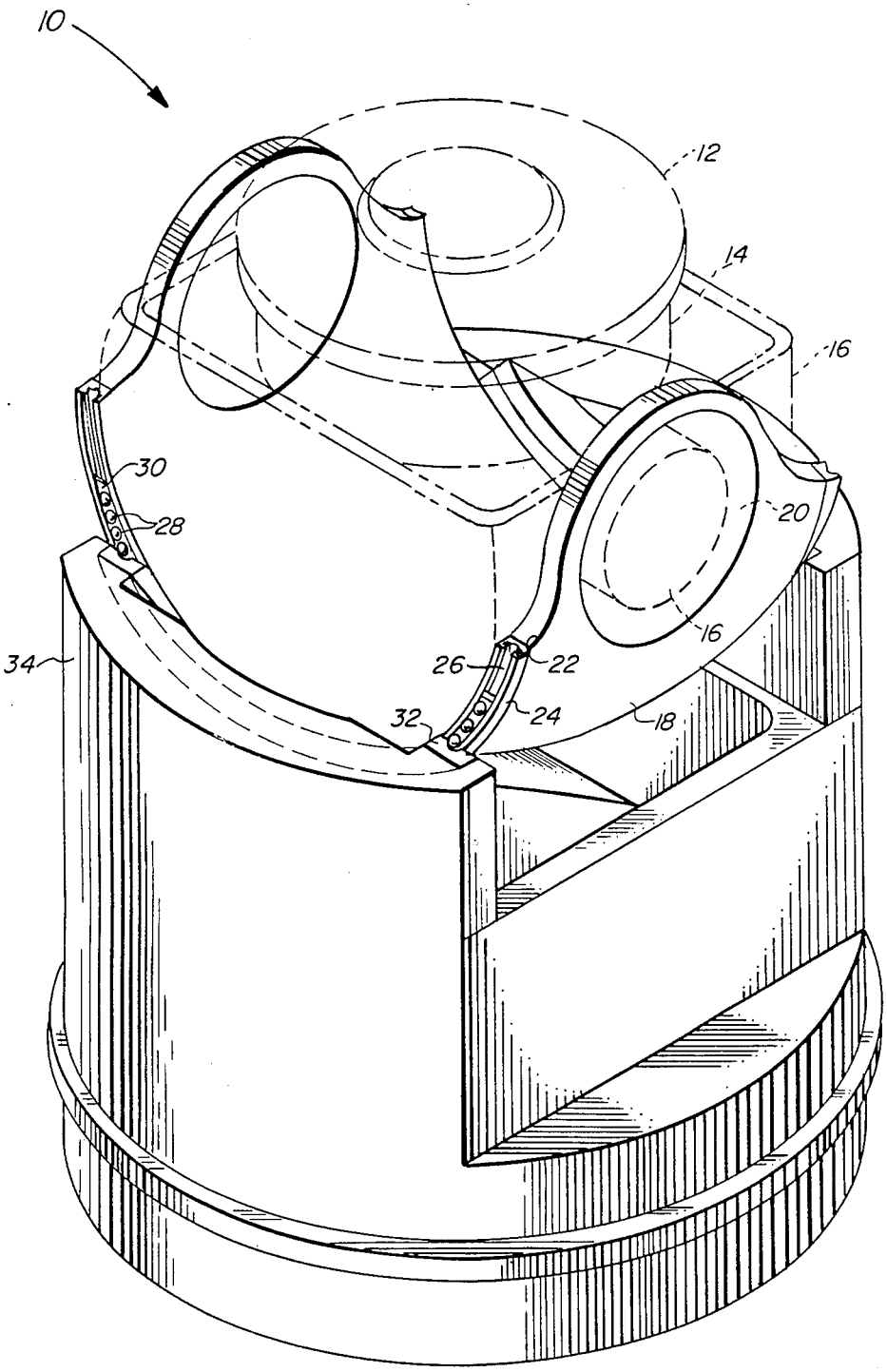
FIG. 1 is an isometric view of a representative gimballed platform including a first embodiment of the invention.

FIG. 1 is a view of a representative gimbal system 10 having an arcuate rolling bearing 11 which is a first embodiment of the subject invention. System 10, typically, has an antenna 12 attached to a platform 14. Platform 14 is in turn attached to an inner gimbal ring 16. Inner ring 16 is mounted for rotation within an outer bail-shaped gimbal ring 18 by a pair of bearings 20 each of which rotationally receives an extension 21 of ring 16, only one of these bearings and the corresponding extension being shown in FIG. 1. Outer ring 18 rotates about an axis 19, which is defined by arcuate bearing 11, and has an edge 22 facing axially thereof. Bearing 11 has a first circularly arcuate race 24 that is fixedly mounted to edge 22 by adhesive bonding or any other suitable attachment means. First race 24 has a first axially facing bearing track 26. Disposed in rolling engagement with first track 26 is a plurality of rolling elements, such as balls 28, conventional in the bearing art. Balls 28 are held and separated by an arcuate cage 30, and are kept in substantially constant contact with first track 26 by structure to be discussed in greater detail. A second circularly arcuate race 32 is fixedly mounted to a base 34 by any suitable attachment means such as adhesive bonding. Races 24 and 32 are made of any suitable material. Second race 32 has a second axially facing bearing track 36, best shown in FIG. 2, of the same radius as first track 26. Second track 36 segmentally opposes first track 26, "segmentally" as so used herein meaning that second track 36 opposes only a portion or segment of first track 26. A number of the balls 28 are rollingly engaged between first track 26 and second track 36. The remainder of balls 28 continue within the first track 26 beyond the second track 36. These remainder balls provide a continued rolling surface for rotation of the gimbal ring with respect to the base, and are retained in the first track by structure to be hereafter discussed.

FIG. 2 is a cross-section of bearing interfaces of the inventive embodiment shown in FIG. 1. One of the balls 28 is shown disposed between first race 24 and second race 32 in rolling engagement with first track 26 and with second track 36. First track 26 and second track 36 are of a well-known Gothic arch shape to provide a four-point contact surface; however, a variety of track configurations may be used as is well understood in the bearing art. Bearing 11 has an inner shoulder 38 and an outer shoulder 40 which are mounted to first race 24 and are coaxial therewith in relation to axis 19 which is shown in FIG. 1. Shoulders 38 and 40 and race 24 may be unitarily constructed or, as is shown, the shoulders may be made independently of the race and then be attached thereto. Inner shoulder 38 is positioned at a lesser radius measured from axis 19 than the radius at which outer shoulder 40 is positioned. With respect to axis 19, inner shoulder 38 has a radially outer surface 42, and outer shoulder 40 has a radially inner surface 44 facing outer surface 42 and coaxial thereto. Outer surface 42 has a radially inwardly extending inner groove 46, and in like but opposite manner, inner surface 44 has a radially outwardly extending outer groove 48.

Figure 3:
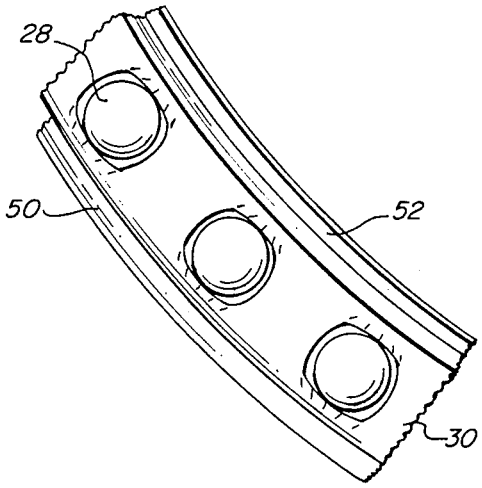
FIG. 3 is a perspective view of a portion of the cage used in the embodiment shown in FIGS. 1 and 2.

Referring to FIGS. 2 and 3, it can be seen that cage 30 is configured so as to separate and hold balls 28 while permitting them to rollingly engage tracks 26 and 36. Cage 30 is swaged, as indicated by numeral 49 in FIG. 3, or is machined to hold balls 28 tightly enough to keep the balls from falling out of the cage but loosely enough to permit them to rotate freely within the cage. Cage 30 is typically made of a soft metal; however, those skilled in the art will realize that a cage of non-metallic material, such as oil-impregnated "Micarta", may also be used. As is shown in FIGS. 2 and 3, a first radially extending guide member 50 is fixedly mounted to cage 30. A second radially extending guide member 52 is also fixedly mounted to cage 30 and is positioned opposite thereof from first member 50. The guide members and the cage may be unitarily constructed, or the members may be manufactured separately of the cage and then attached thereto. As is shown in FIG. 2, first member 50 extends into inner groove 46 for slideable engagement therewith. Similarly, second member 52 extends into outer groove 48 for slideable engagement therewith.

Referring again to FIGS. 1 and 2, operation of the invention is such that, as gimbal ring 18 rotates with respect to base 34, a continued rolling surface is maintained between first track 26 of first race 24, and second track 36 of race 32. Those of balls 28 that are initially unopposed by the second track 36 may become rollingly engaged between tracks 36 and 26 as gimbal ring 18 rotates. Any difference between track and balls speeds is thus compensated for. As ring 18 rotates, those of balls 28 that become unopposed by second track 36 are retained in first track 26 since cage 30 is configured to hold balls 28 and guide members 50 and 52, which are fixedly mounted to cage 30, slideably engage grooves 46 and 48, respectively, and keep cage 30 substantially adjacent first race 24 and first track 26.

Second Embodiment

Figure 4:
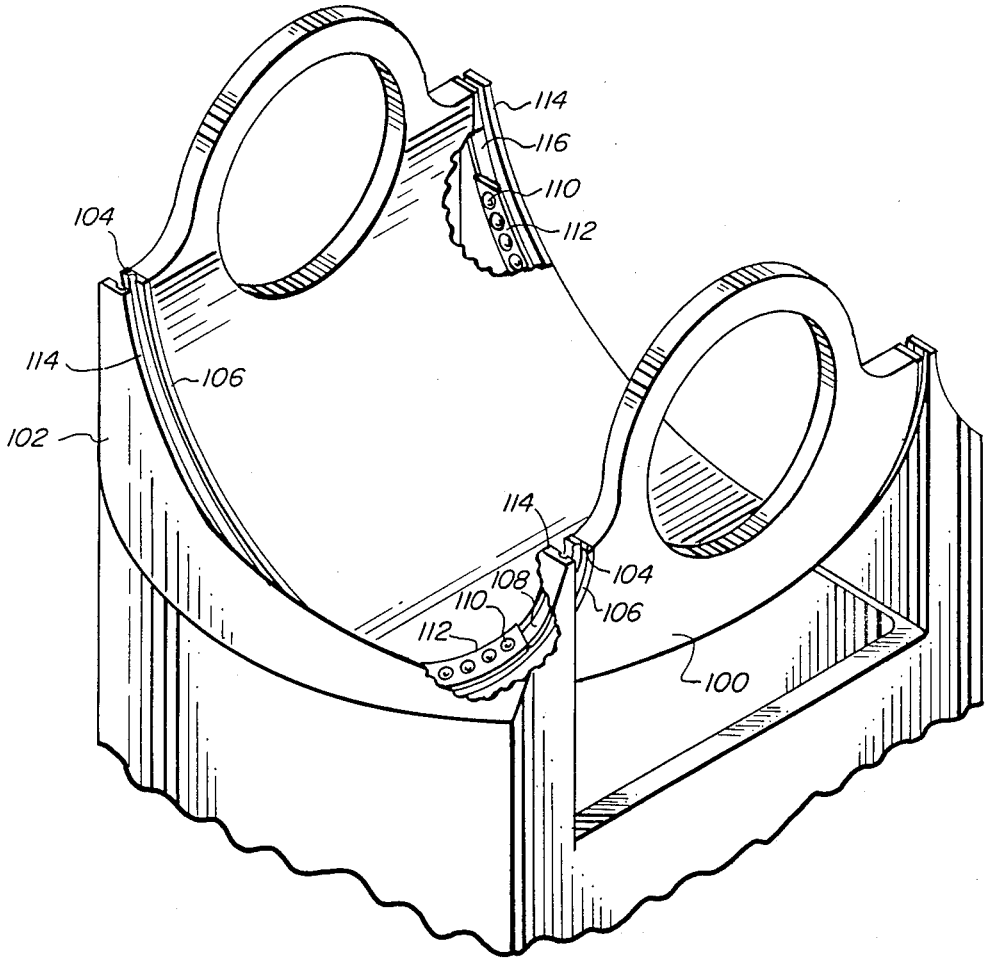
FIG. 4 is an isometric view of a gimbal ring and base cut away to show a second embodiment of the invention.

FIG. 4 shows a portion of a gimbal system, of the general type shown in FIG. 1, having an arcuate bearing 98 which is a second embodiment of the subject invention. The gimbal system includes an outer bail-shaped gimbal ring 100 rotatably mounted to a base 102.

Referring to both FIGS. 4 and 5, gimbal ring 100 rotates about an axis 103, shown in FIG. 4, and has an axially facing edge 104. Bearing 98 has a first circularly arcuate race 106 that is fixedly mounted to edge 104 by adhesive bonding or any other suitable attachment means. First race 106 has a first axially facing bearing track 108. Disposed in rolling engagement with first track 108 is a plurality of rolling elements, such as balls 110, conventional in the bearing art. Balls 110 are held and separated by an arcuate cage 112 to be described in greater detail. A second circularly arcuate race 114 is fixedly mounted to second circularly arcuate race 114 is fixedly mounted to the base 102 by any suitable attachment means such as adhesive bonding. Races 106 and 114 are made of any suitable material. As is best shown in FIG. 4, second race 114 has a second axially facing bearing track 116 of the same radius as first track 108. Second track 116 opposes first track 108 so that balls 110 are rollingly engaged between tracks 108 and 116. First track 108 and second track 116 are of a well-known Gothic arch configuration to provide a four-point contact bearing surface, however other track configurations may be used. Cage 112 is slideably engaged between first race 106 and second race 114, and permits balls 110 to rollingly contact tracks 108 and 116 as well be described.

Figure 6:
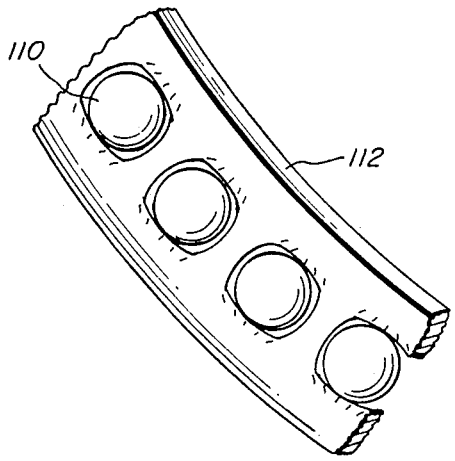
FIG. 6 is perspective view of a portion of the cage used in the embodiment shown in FIGS. 4 and 5.

Referring to FIGS. 5 and 6, it can be seen that cage 112 holds and separates balls 110 while permitting the balls to rollingly engage adjacent bearing tracks 108 and 116. Cage 112 may be swaged, as depicted in FIG. 6, or may be machined to hold balls 110 tightly enough to keep the balls from falling out of the cage but loosely enough to permit them to rotate freely within the cage. However, cage 112, unlike cage 30 of bearing 11 of the first embodiment, need not be so configured since balls 110 are kept within cage 112 by the adjacent bearing tracks 108 and 116. Cage 112 is, preferably, made of a soft metal; however, those skilled in the bearing art will realize that a cage of non-metallic material may also be used.

Referring again to FIG. 4, it can be seen that first track 108 and second track 116 extend beyond ball cage 112 so that, as gimbal ring 100 is rotated with respect to base 102, balls 110 are retained within the tracks. Differences in ball and track speeds are thus compensated for by these additional lengths of track.

For both embodiments of the invention, constructing the gimbal ring and base of suitable bearing material would allow the tracks of the bearing to be cut directly into these gimbal system components, rather than attaching the tracks thereto. Furthermore, it should be understood that though the invention has been described for use with the outer gimbal ring of a gimbal system, the invention may be used with inner gimbal rings in which the adjacent outer ring would served as a base.

Obviously, those skilled in the art will realize that these and other modifications and variations of the invention are possible in light of the above teachings. Therefore, it is to be understood that within the scope of the following claims the invention may be practiced otherwise than as specifically described.

What is claimed is:

1. A rolling bearing comprising:

a first circularly arcuate race defining a first axially facing bearing track;

a plurality of rolling elements disposed in rollable engagement with said first track;

cage means for holding said rolling elements and for separating said rolling elements from each other; and a second circularly arcuate race defining a second axially facing bearing track having the same radius as said first track and being axially opposed thereto so that said second track is rollably engaged with said elements.

2. The bearing of claim 1 in which said cage means is slideably engaged between said first race and said second race.

3. The bearing of claim 1 in which said second track segmentally opposes said first track so that a number of said rolling elements are rollably engaged with said second track.

4. The bearing of claim 3 further comprising means for slideably keeping said cage substantially adjacent to said first race so that said rolling elements are retained in said first track.

5. A rolling bearing for rotatably supporting a gimbal ring of a gimbal system upon a base of said system, said gimbal ring being rotatable about an axis and having an axially facing edge, the bearing comprising:

a first circularly arcuate race mounted to said edge of said gimbal ring, said first race defining a first axially facing bearing track;

a plurality of rolling elements disposed in rollable engagement with said first track;

a cage for holding said rolling elements and for separating said rolling elements from each other; and a second circularly arcuate race defining a second axially facing bearing track having the same radius as said first track and being axially opposed thereto so that said second track is rollably engaged with said elements.

6. The bearing of claim 5 in which said cage is disposed in slideable engagement between said first race and said second race.

7. The bearing of claim 5 in which said second track segmentally opposes said first track so that a number of said rolling elements are rollably engaged with said second track.

8. The bearing of claim 7 further comprising means for slideably keeping said cage substantially adjacent to said first race so that said plurality of rolling elements are retained in said first track.

9. The bearing of claim 8 in which said keeping means includes:

an inner shoulder and an outer shoulder which are coaxially mounted to said first race, said inner shoulder being positioned at a lesser radius measured from said axis than the radius at which said outer shoulder is positioned, said inner shoulder defining a radially inwardly extending inner groove and said outer shoulder defining a radially outwardly extending outer groove facing said inner groove; and a first guide member and a second guide member which are oppositely mounted to said cage, said first member extending into said inner groove for slideable engagement therewith and said second member extending into said outer groove for slideable engagement therewith so as to slideably keep said cage substantially adjacent said first race so that said plurality of rolling elements are retained in said first track.

10. A four-point contact ball bearing for supporting a generally bail-shaped gimbal ring of a gimbal system upon a base of said system, said gimbal ring being rotatable about an axis and having an axially facing edge, said bearing comprising:

a first circularly arcuate race mounted to said axial edge of said gimbal ring, said first arcuate race defining a first axially facing bearing track;

a plurality of balls disposed in rollable engagement with said first track;

an arcuate cage for holding said balls and separating said balls from each other, said cage having opposite, radially extending first and second guide members;

means for slideably keeping said cage substantially adjacent to said first race so that said plurality of balls are retained in said first track, said keeper means having:

an inner shoulder and an outer shoulder which are coaxially mounted to said first race, said inner shoulder being positioned at a lesser radius measured from said axis than the radius at which said outer shoulder is positioned, said inner shoulder defining a radially inwardly extending inner groove and said outer shoulder defining a radially outwardly extending outer groove facing said inner groove, where said first guide member of said cage extends into said first inner groove for slideable engagement therewith and said second guide member of said cage extends into said outer groove for slideable engagement therewith; and a second circularly arcuate race mounted to said base and defining a second axially facing bearing track having the same radius as said first track and being segmentally opposed thereto so that a number of said balls are rollably engaged with said second track.

11. The bearing of claim 1 in which said first track of said first circularly arcuate race and said second track of said second circularly arcuate race extend beyond said cage containing said plurality of rolling elements so that said plurality of rolling elements are retained within said tracks when said tracks are rotated with respect to each other.

12. The bearing of claim 5 in which said first track of said first circularly arcuate race and said second track of said second circularly arcuate race extend beyond said cage containing said plurality of rolling elements so that said plurality of rolling elements are retained within said tracks when said tracks are rotated with respect to each other.

13. A rolling bearing for rotatably supporting an outer gimbal ring of a gimbal system upon a base of said system, said gimbal ring being partial, stopped rotatable about an axis and having an axially facing edge, the bearing comprising:

a first arcuate race having a circular shape and concentric with said axis mounted to said edge of said gimbal ring, said first race defining a first axially facing bearing track;

a plurality of rolling elements disposed in rolling engagement with said first track;

a cage for holding said rolling elements and for separating said rolling elements from each other; and a second circularly shaped arcuate race mounted to said base of said gimbal system, said second race defining a second axially facing bearing track having the same radius as said first track and being axially opposed thereto so that said second track is rollably engaged with said rolling elements, said first track of said first circularly arcuate race and said second track of said second circularly arcuate race being extended beyond said cage containing said plurality of rolling elements so that said plurality of rolling elements are retained within said tracks when said tracks are rotated with respect to each other.

* * * * *